United States Patent
Wong

(10) Patent No.: US 9,268,822 B2
(45) Date of Patent: Feb. 23, 2016

(54) SYSTEM AND METHOD FOR DETERMINING ORGANIZATIONAL HIERARCHY FROM BUSINESS CARD DATA

(71) Applicant: salesforce.com, inc., San Francisco, CA (US)

(72) Inventor: Fang Wong, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 242 days.

(21) Appl. No.: 13/870,780

(22) Filed: Apr. 25, 2013

(65) Prior Publication Data

US 2014/0025686 A1  Jan. 23, 2014

Related U.S. Application Data

(60) Provisional application No. 61/672,904, filed on Jul. 18, 2012.

(51) Int. Cl.
*G06F 17/30* (2006.01)
*G06Q 10/10* (2012.01)

(52) U.S. Cl.
CPC ............ *G06F 17/3053* (2013.01); *G06Q 10/10* (2013.01)

(58) Field of Classification Search
CPC .................... G06Q 10/063112; G06Q 10/105; G06F 17/3089; G06F 17/30; G06F 17/30598
USPC ...................... 707/E17.014, 769, 999.01, 722, 707/E17.001, E17.109, 723, 999.001, 707/999.003, 999.107, E17.009, E17.044, 707/E17.059, E17.089, E17.11, 688, 689, 707/709, 710, 737, 740, 748, 749, 754, 756, 707/802, 999.002, 999.009, 999.102, 707/999.104, 999.2; 709/224, 203, 204, 709/217, 218, 219, 226, 245, 246, 200, 201, 709/202, 206, 212, 216, 220, 221, 229, 709/231; 705/37, 14.12, 14.4, 14.64, 1.1, 705/26.1, 30, 31, 313, 317, 35, 39, 7.13, 705/7.14, 14.1, 14.14, 14.23, 14.49, 14.53, 705/14.58, 14.66, 14.69, 14.72, 26.8, 28, 705/305, 307, 32, 320, 34, 342, 347, 38, 705/400, 500, 7.11; 726/1, 26, 27, 28, 17, 726/2, 30
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |

(Continued)

OTHER PUBLICATIONS

U.S. Appl. No. 13/986,251, filed Apr. 16, 2013.

*Primary Examiner* — Jay Morrison
*Assistant Examiner* — Ken Hoang
(74) *Attorney, Agent, or Firm* — Dergosits & Noah LLP; Todd A. Noah

(57) ABSTRACT

A system and method for determining organizational hierarchy from contact data. A phrase having multiple terms representing a job title is received and converted to lower case, then concatenated with a symbol to separate the terms. The phrase is compared to a training set of predefined normalized phrases representing known job titles. If a match is found, a data record is created or updated with organizational hierarchy information associated with the matched phrase in the training set. If a match is not found, a term is removed from the phrase and the comparison repeated.

16 Claims, 11 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0259643 A1* | 10/2009 | Peng et al. ......... 707/4 |
| 2012/0197825 A1* | 8/2012 | Medlock et al. ......... 706/11 |
| 2012/0233137 A1 | 9/2012 | Jakobson et al. |
| 2012/0278339 A1* | 11/2012 | Wang ......... 707/748 |
| 2013/0198179 A1* | 8/2013 | Arnott et al. ......... 707/736 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

* cited by examiner

1: associate_marketing_program_manager_and_business_development_executive

2: associate_marketing_program_manager_and_business_development

3: associate_marketing_program_manager_and_business

4: associate_marketing_program_manager_and

5: associate_marketing_program_manager

6: associate_marketing_program

7: associate_marketing

8: associate

NO MATCH

*FIG. 5A*

1: marketing_program_manager_and_business_development_executive

2: marketing_program_manager_and_business_development

3: marketing_program_manager_and_business

4: marketing_program_manager_and

5: marketing_program_manager

MATCH Marketing Dept (rank = 20); SCORE = 50

*FIG. 5B*

1: and_business_development_executive

2: and_business_development

3: and_business

4: and

NO MATCH

*FIG. 5C*

1: business_development_executive

2: business_development

MATCH Marketing Dept (rank = 20); SCORE = 100
MATCH Sales Dept (rank = 10); SCORE = 50

*FIG. 5D*

1: executive

MATCH Marketing Dept (rank = 20); SCORE = 150
MATCH Sales Dept (rank = 10); SCORE = 50

*FIG. 5E*

| title | rank | weight |
|---|---|---|
| founder | 10 | 1000000 |
| owner | 10 | 1000000 |
| Board Member | 10 | 100 |
| Board of Directors | 10 | 100 |
| CEO | 10 | 1000000 |
| Chairman | 10 | 1000000 |
| Chairperson | 10 | 1000000 |
| Chairwoman | 10 | 1000000 |
| Chief of Staff | 20 | 50 |
| Chief Compliance Officer | 10 | 100 |
| Chief Information Officer | 10 | 1000000 |

*FIG. 7*

| title | dept | weight |
|---|---|---|
| research | 60 | 100 |
| information technology | 80 | 100 |
| human resources | 40 | 100 |
| systems | 80 | 100 |
| financial | 30 | 100 |
| partner | 30 | 100 |
| administrative | 30 | 100 |

*FIG. 8*

SYSTEM AND METHOD FOR DETERMINING ORGANIZATIONAL HIERARCHY FROM BUSINESS CARD DATA

CLAIM OF PRIORITY

This application claims priority from U.S. Provisional Patent Application No. 61/672,904 entitled System and Method for Determining Organizational Hierarchy, by Fang Wong, filed Jul. 18, 2012, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

The subject matter disclosed herein relates generally to database records management, and more particularly, to infer reporting relationships between using records of the same company using a probabilistic analysis.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access their data resources in a single logical database. Typically, data is retrieved from and stored to the database using the computing systems or devices of the user. For example, a user system might remotely access one of a plurality of servers that might in turn access the database. The user may issue a query to the database in order to retrieve data. The database processes the query and returns to the user information from the database that is relevant to the request. The retrieval of accurate information and subsequent delivery of this information to the user system in a timely and efficient manner has been and continues to be a goal of administrators of database systems.

In a multi-tenant database system ("MTS"), however, various elements of hardware and software of the database may be shared by one or more customers. The notion of "cloud computing" allows service providers to offer access to hardware/software systems through a network, such as the Internet. For example, a specified application server may simultaneously process requests for many different customers, and a specified database table may likewise store data for many different customers.

In the MTS environment, customers demand up-to-date, comprehensive data. For example, sales and marketing organizations need accurate and up-to-date contact information in order to maintain good relations with existing customers as well as solicit leads for new customers. Unfortunately, conventional databases rely on individuals to maintain their own contact information, and therefore, even within a single organization, individuals may have inconsistent and/or inaccurate contact information.

An advantage of the MTS system is that business enterprises may share data resources, and rely on the MTS provider to maintain accurate up-to-date data, such as personal and/or business contact information. Another advantage is that all personnel within a single enterprise have access to the exact same contact information, so that inaccuracies or inconsistencies within the organization no longer exist. Yet another advantage is that the MTS system can provide value-added services to enhance the data stored as contact information in the MTS contact database. For example, one type of information that is commonly missing from contact databases is the rank and/or department for a business contact, i.e., some indication of the person's place in the corporate hierarchy. Such information can be very useful, for example, in marketing efforts. Accordingly, it is desirable to provide techniques in the database for determining the organizational hierarchy, i.e., rank and/or department, from contact data.

BRIEF DESCRIPTION OF THE DRAWINGS

In the following drawings, like reference numbers are used to refer to like elements. Although the following figures depict various examples, the one or more implementations are not limited to the examples depicted in the figures.

FIGS. 5A-5E are examples illustrating the process of FIG. 4 for determining organization hierarchy from contact information.

FIG. 7 illustrates a training set for rank as a look-up table.

FIG. 8 illustrates a training set for department as a look-up table.

DETAILED DESCRIPTION

1. Simplified System Overview

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query refers to a set of steps used to access information in a database system.

Figure 1:
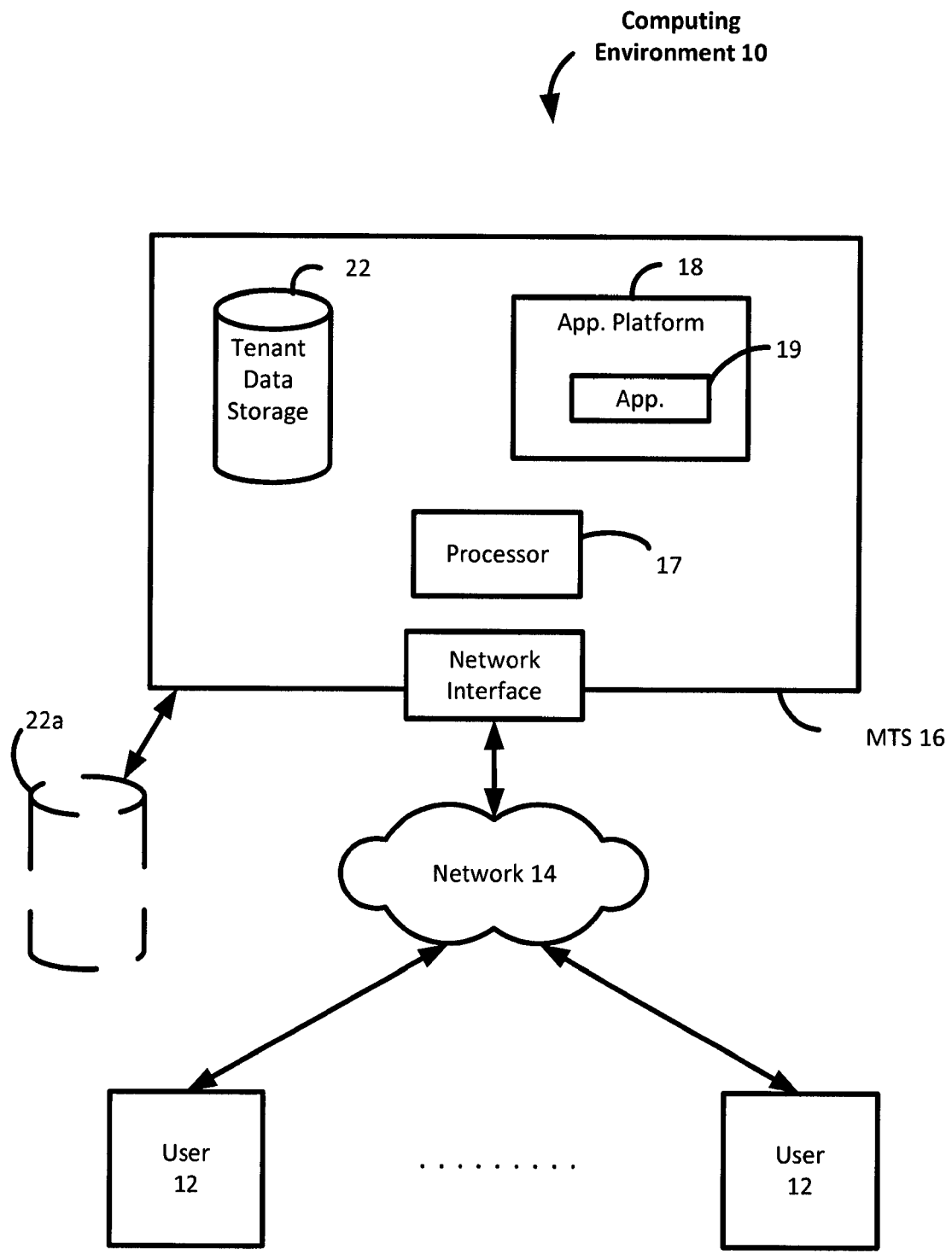
FIG. 1 is a simplified block diagram illustrating a multi-tenant database system ("MTS").
Figure 9:
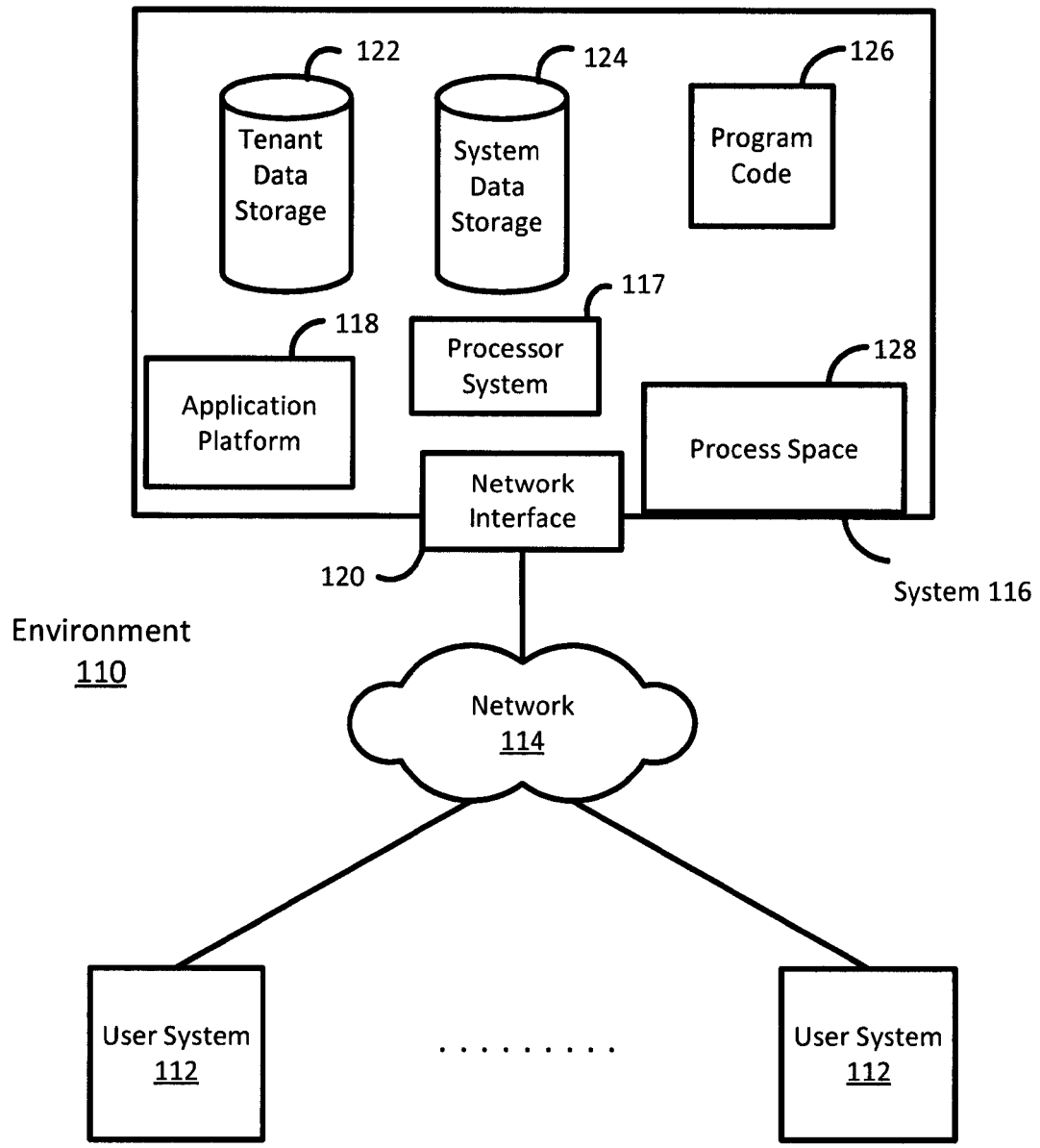
FIG. 9 illustrates a block diagram of an example of an environment wherein an on-demand database service might be used.

FIG. 1 illustrates an embodiment of an on-demand, multi-tenant database service ("MTS") 16 operating in a computing environment 10. User devices or systems 12 access and communicate with the MTS 16 through network 14 in a known manner. More detailed examples for implementing the MTS 16 are shown in FIGS. 8-9, described below. For example, user devices 12 may be any computing device, such as a desktop, laptop, table, smartphone, etc. Network 14 may be any type of computing network, such as the Internet, local area network, wide area network, etc. The operation of the MTS 16 is controlled by a processor system 17 running an operating system.

The MTS 16 provides the users of user systems 12 with access to many features and applications available on or through MTS 16. In particular, the MTS 16 includes tenant data storage 22, which is configured through the MTS to maintain tenant data for multiple users/tenants, as further described below and in the patent references mentioned above. Tenant data storage 22 may be physically incorporated within MTS 16, or may alternatively be remote storage 22a (shown in dashed lines), likewise accessible and useful to the MTS to support user systems 12.

Figure 2:
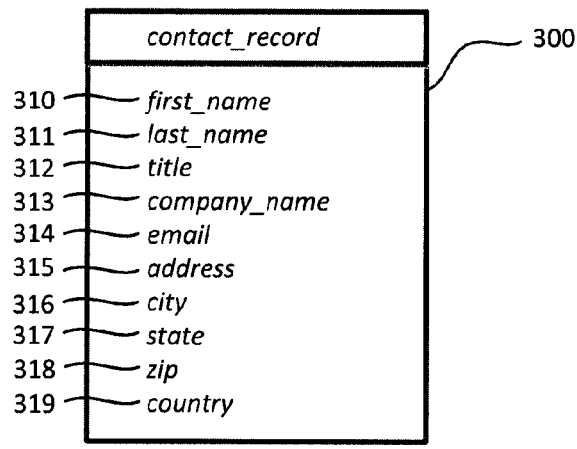
FIG. 2 is a block diagram illustrating a contact record.

There are many types of tenant data that may be maintained in tenant data storage 22, including, in particular, contact data, i.e., information about an individual, including name, company, address, telephone number, etc. FIG. 2 illustrates a typical database record 300 for a contact. In this embodiment, the contact record 300 has a number of defined fields or entities, including: first_name 310, last_name 311, (job) title 312, company_name 313, email 314, address 315, city 316, state 317, zip 318, and country 319. Other fields or other formats may be used, but typically, the database design includes specific predefined entities for the record types maintained by the database, such as the fields defined for contact record 300 as shown in FIG. 2.

An important objective for any user of MTS 16 is to maintain up-to-date and detailed information for all contacts. For example, if contact data is received for integration into the database, but has different entity formats, it should be normalized to conform to the database definition. A unique feature of MTS 16 described herein is one or more applications 19, managed and operated by the MTS through its application platform 18, that facilitate this objective by providing one or more sets of program instructions providing features to help maintain and secure the accuracy and reliability of the contact data, as well as enhance the data. For example, instructions may be provided for inferring details, such as organizational hierarchy, from contact data imported into and/or stored in the database, thereby normalizing the data relative to the database configuration.

Figure 3:
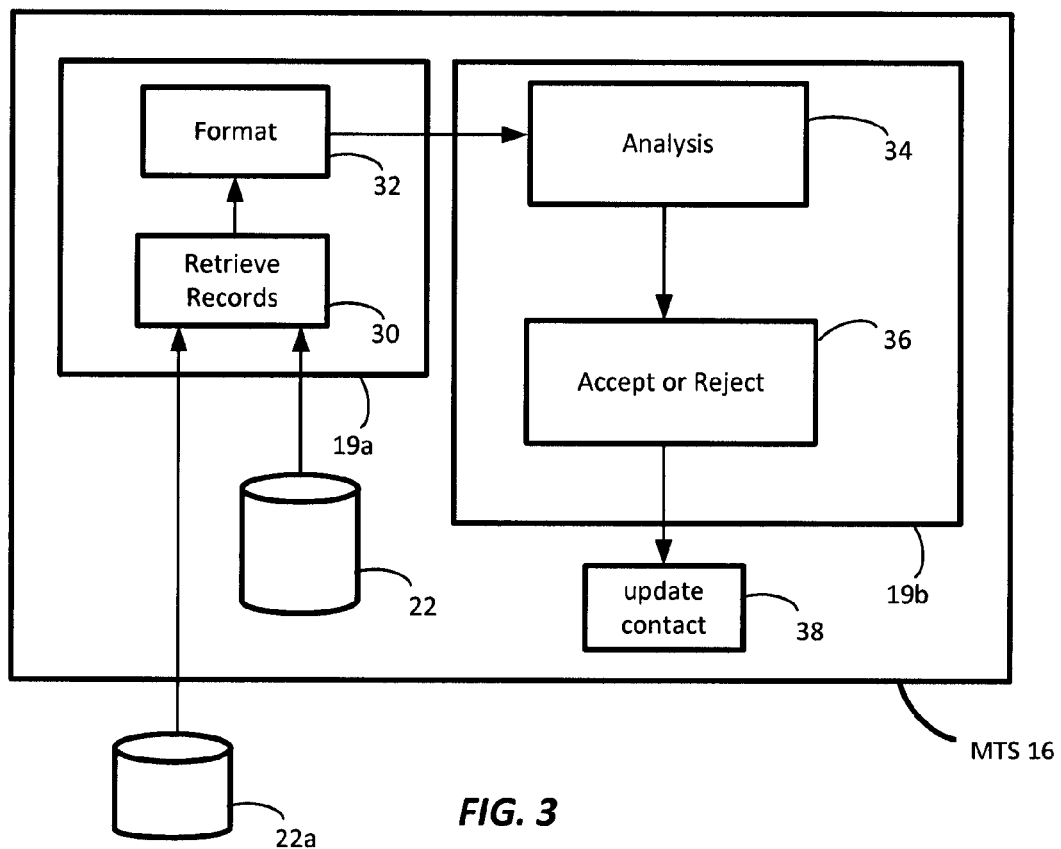
FIG. 3 is a block diagram illustrating the operational flow caused by program instructions for determining organization hierarchy from contact records stored in the MTS.

The block diagram shown in FIG. 3 illustrates the operation of an application 19a that handles simple pre-processing steps, and a corresponding application 19b, which handles the main processing steps of a method for determining the organizational hierarchy, e.g., rank and department, for an individual contact based on the title field of the contact data. Although two applications 19a and 19b are shown as part of the MTS 16, these applications may implemented in one or more parts or modules, and may also be located elsewhere, but accessible to the MTS. Also, the construction of suitable program code and interaction between different code modules can vary greatly according to need and/or desire and software platform, and thus the illustrated embodiments are not intended to limit how various software solutions may be implemented.

In application 19a, a first program module 30 has program code suitable to retrieve contact records from data storage 22, or to receive or import contact records from an external source 22a. A second program module 32 formats the received contact records, or more accurately, formats one or more selected fields from the contact records according to a defined scheme. For example, as disclosed herein, all the words of the title field of a contact record will be converted to lower case letters and then concatenated with a symbol such as an underscore to form a modified string for processing. The creation of program code suitable to retrieve data records is routine for those skilled in these arts and need not be described in further detail herein. The formatting of data from the title field is described below.

Once the pre-processing steps receive and format relevant data, then analysis of the formatted data is performed in analysis module 34 of application 19b. The result of the analysis is the determination of an individual's role in the hierarchy of an organization, i.e., rank and department, based on an inference from the title field of the contact data. A confidence score is associated with this inference. If the confidence score exceeds a defined threshold in module 36, then the inference is accepted, and the contact data in the database is updated or supplemented in module 38.

2. Determining Organizational Hierarchy from Contact Data

As noted above, the tremendous variety of organizational classifications associated with contact data, such as job title and department, can make it difficult to properly characterize individual contact data when it is stored in the contact database. However, the method described herein simplifies such characterizations by normalizing a phrase of interest in the contact data, then looking up the normalized phrase in a predefined training set. If found, then inferences related to organizational classification can be made based on such inferences being a part of the training set.

Figure 4:
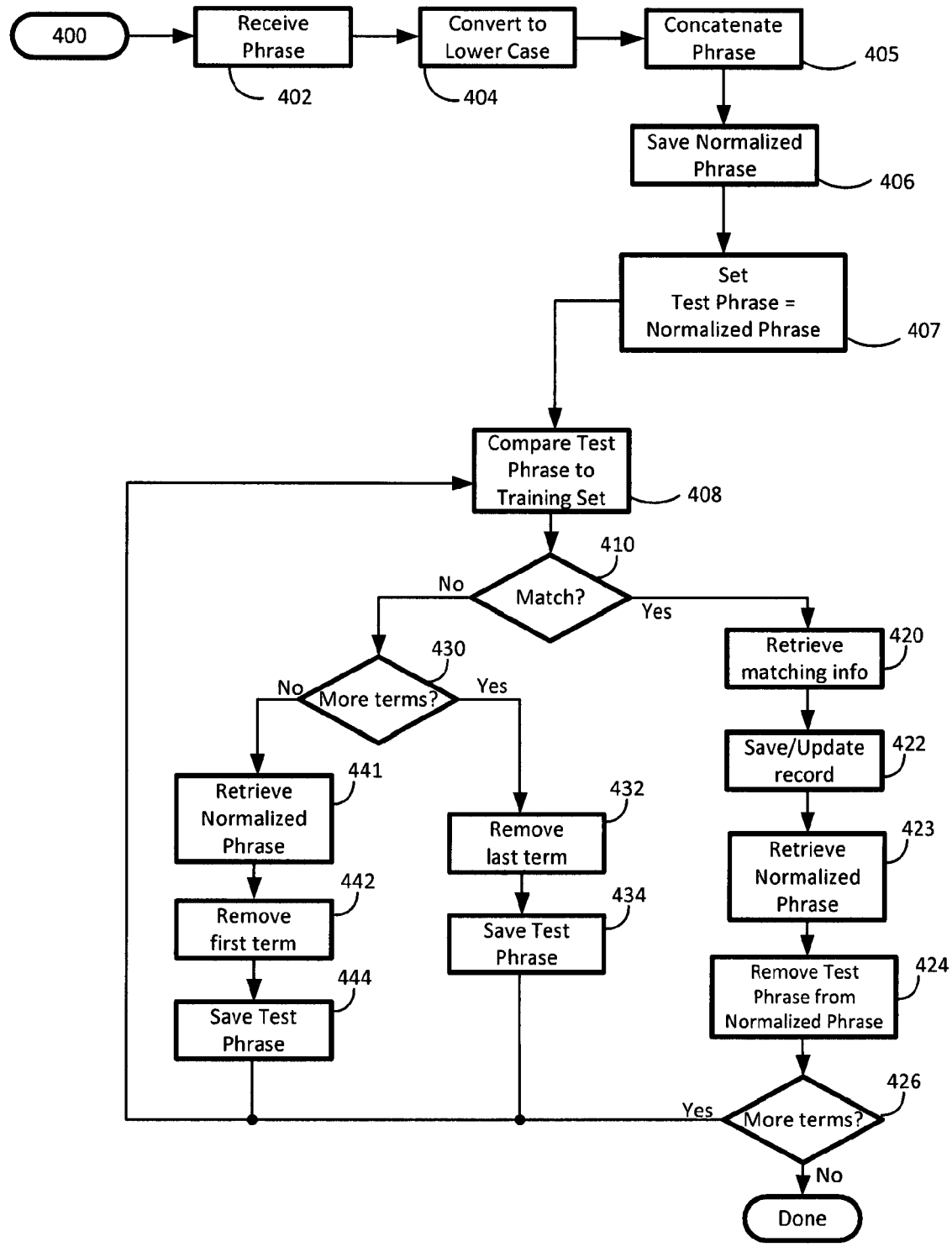
FIG. 4 is a flow chart illustrating one embodiment of a process for determining organization hierarchy from contact information.

Referring now to FIG. 4, a process 400 is illustrated for inferring organizational classifications or hierarchy from the title field of the contact data. The knowledge of organizational hierarchy associated with a business contact can be important for many reasons, for example, in sales and marketing efforts, or in customer relations. The process 400 is preferably implemented as one or more sets of computer-executable program instructions organized as one or more program modules and installed on a computing device either as part of the computer operating system to control the contact database, or as a discrete application(s) running on top of the operating system. The process 400 may be initiated in various ways, for example, by a user query, or as part of a regular maintenance routine for the contact database, or as part of an integration module for receiving new contact data into the database.

In step 402, contact data for an individual contact record is received for processing by the database, including a phrase representing the title field. The contact data may already be stored as a contact record in the database, or it may come from an outside source for integration into the database. The title phrase is a string of one or more discrete terms including words or symbols, such as "owner" or "CEO" or a much longer string, such as "Associate Marketing Program Manager and Business Development Executive." The title phrase or the entire contact record may be placed into temporary storage and/or other links or records may be created by the database to facilitate record handling and processing. For example, the contact record may be stored in its original format in the database and then supplemented or linked to an additional record with other useful information, such as the department and rank of the individual within the company.

In step 404, the database converts each word of the title phrase to lower case letters. Programmable methods for doing so are well known, including, for example, the use of the JavaScript method toLowercase( ) and the Visual Basic method ToLower (or LCase). Symbols and other non-alphabetic characters are ignored. In step 405, the string of lower case words is concatenated together using a generic symbol such as an underscore. Programmable methods for performing concatenation of strings are also well known. For example, the JavaScript operator "+" represents a concatenation operation. Therefore, the JavaScript statement document.write (a+"_"+b), where a represents the term "department" and b represents the term "manager," gives the result "department_manager." In Visual Basic, the operators "+" and "&" are both used as concatenation operators. Thus, after steps 404 and 405, a title phrase such as "Department Manager" becomes the normalized phrase "department_manager." The normalized phrase is saved into temporary storage in step 406, and a variable test phrase is set equal to the normalized phrase in step 407.

In step 408, the database compares the test phrase to a training set. In general, the training set is a set of entries that represent known job titles, stored in a lookup table in the normalized format, i.e., as a string of lower case words concatenated with underscores, and correlated in the lookup table with departments and/or ranks. Further, each correlated department and rank in the training set is assigned a weight representing a confidence score, i.e., a quantitative measure of how likely the particular job title has the specified rank and/or department. The creation and maintenance of one or more training sets is described further below.

If the comparison of the test phrase to the entries in the training set results in an exact match (step 410), then the corresponding information associated with the matched entry, e.g., department and/or rank, is retrieved from the lookup table in step 420, along with the confidence score associated with the information. In step 422, the information associated with the matched entry, e.g., the rank and/or department and corresponding confidence score, is saved, for example, by creating or updating a contact record for the received data or linking the information as a new data record associated with the contact record. In addition, the normalized title associated with the matched entry may also be appended to the contact record or linked as a new record associated with the contact record in step 422. In this way, the titles associated with contact data can be normalized over the database.

In step 423, the normalized phrase is retrieved from storage. In step 424, the test phrase that resulted in a match is removed from the normalized phrase, and the test phrase is set equal to this newly modified phrase in step 425. If there are multiple terms to consider in the test phrase in step 426, then the process returns to step 408 for further comparisons.

If there is not an exact match in step 410, then the process checks to see if there are multiple terms left in the test phrase in step 430. If so, then the term at the end of the test phrase (including its corresponding underscore) is removed in step 432, the shortened test phrase is saved in step 434, and the comparison step 408 is repeated with the shortened test phrase.

If there are not multiple terms left in the test phrase in step 430, i.e., only a single term remains, then the normalized phrase is retrieved from storage in step 441. The term at the beginning of the normalized phrase is removed in step 442, this modified phrase is saved as the test phrase in step 444, and the comparison process is started over with the modified test phrase in step 408.

An example of process 400 for determining what department is associated with the business title is illustrated in FIGS. 5A-5E. In FIG. 5A, the example title phrase "Associate Marketing Program Manager and Business Development Executive" is received into a processing buffer in step 402, converted to lower case in step 404, and concatenated with underscores in step 406, resulting in the modified phrase "associate_marketing_program_manager_and_business_development_executive" shown on line 1, and saved in step 407.

This modified phrase is compared with entries in the training set in step 408. In our example, this entry is not found in the training set, and therefore no match is found in step 410. Since there are more terms remaining in the modified phrase in step 430, the last term "executive" is removed in step 432, yielding the modified phrase "associate_marketing_program_manager_and_business_development" as shown on line 2, which is saved in step 434. The process returns to step 408 and compares the modified phrase on line 2 with entries in the training set in step 408. Since this entry is also not found in the training set, no match is found in step 410, and therefore the last term "development" is removed in step 432, yielding the modified phrase "associate_marketing_program_manager_and_business" as shown on line 3.

The process 400 continues in the described loop to remove the last term then compare the modified phrase to entries in the training set until either a match is found, or there are no more terms left to consider. Thus, on line 4 of FIG. 5A, the last term "business" has been removed; on line 5, the last term "and" has been removed; on line 6, the last term "manager" has been removed; on line 7, the last term "program" has been removed; and on line 8, the last term "marketing" has been removed. At this point, only the single term "associate" remains. Since there is no match for that term in the training set at step 410, the original modified phrase is retrieved in step 442, and the first term "associate" of the modified phrase is removed in step 444.

The new phrase "marketing_program_manager_and_business_development_executive" is saved in step 446, as shown in line 1 of FIG. 5B. The process then returns to step 408, where the new phrase is compared to entries in the training set. So long as there is no match but more terms in the phrase, the process will loop through steps 430, 432 and 434, removing the last term as shown on lines 2 through 5, saving the shorter modified phrase, then comparing the shorter modified phrase to the entries in the training set. In this example, a match is found for the phrase on line 5, i.e., "marketing_program_manager," and relevant information is retrieved from the look-up table in step 420, and the record for this contact is updated or linked to a new record in step 422. As an example, the match found for "marketing_program_manager" is classified into the marketing department, which has been assigned a rank of 20, and a confidence score of 50. The record for this contact can then be updated or linked to a new record to include this information.

Since the modified phrase "marketing_program_manager" has a match in the look-up table, that phrase will now be removed from the modified phrase shown in line 1 of FIG. 5B, per step 424 of process 400, resulting in the modified phrase "and_business_development_executive," as shown on line 1 of FIG. 5C.

Process 400 evaluates the modified phrase of FIG. 5C in an iterative loop, and finding no match, removes the last term until only the single term "and" remains, as shown on line 4. Since at that point there are no more terms, in step 430, the first term "and" is removed, and the new modified phrase "business_development_executive" is evaluated, as shown in FIG. 5D.

In line 2 of FIG. 5D, the phrase "business_development" finds two matches in the look-up table. The first match is classified in the marketing department, with a rank of 20, and a confidence score of 100. The second match is classified in the sales department, with a rank of 10, and a confidence score of 50. Both results may be returned, or a means provided for selecting one of the results.

Since the modified phrase "business_development" has a match in the look-up table, that phrase will now be removed from the modified phrase shown in line 1 of FIG. 5D, as in step 424 of process 400, resulting in the modified phrase "executive," as shown on line 1 of FIG. 5E. This entry also finds two matches in the look-up table. The first match is classified in the marketing department, with a rank of 20, and a confidence score of 150. The second match is classified in the sales department, with a rank of 10, and a confidence score of 50. As before, both results may be returned, or a means provided for selecting one of the results.

Figure 6A:
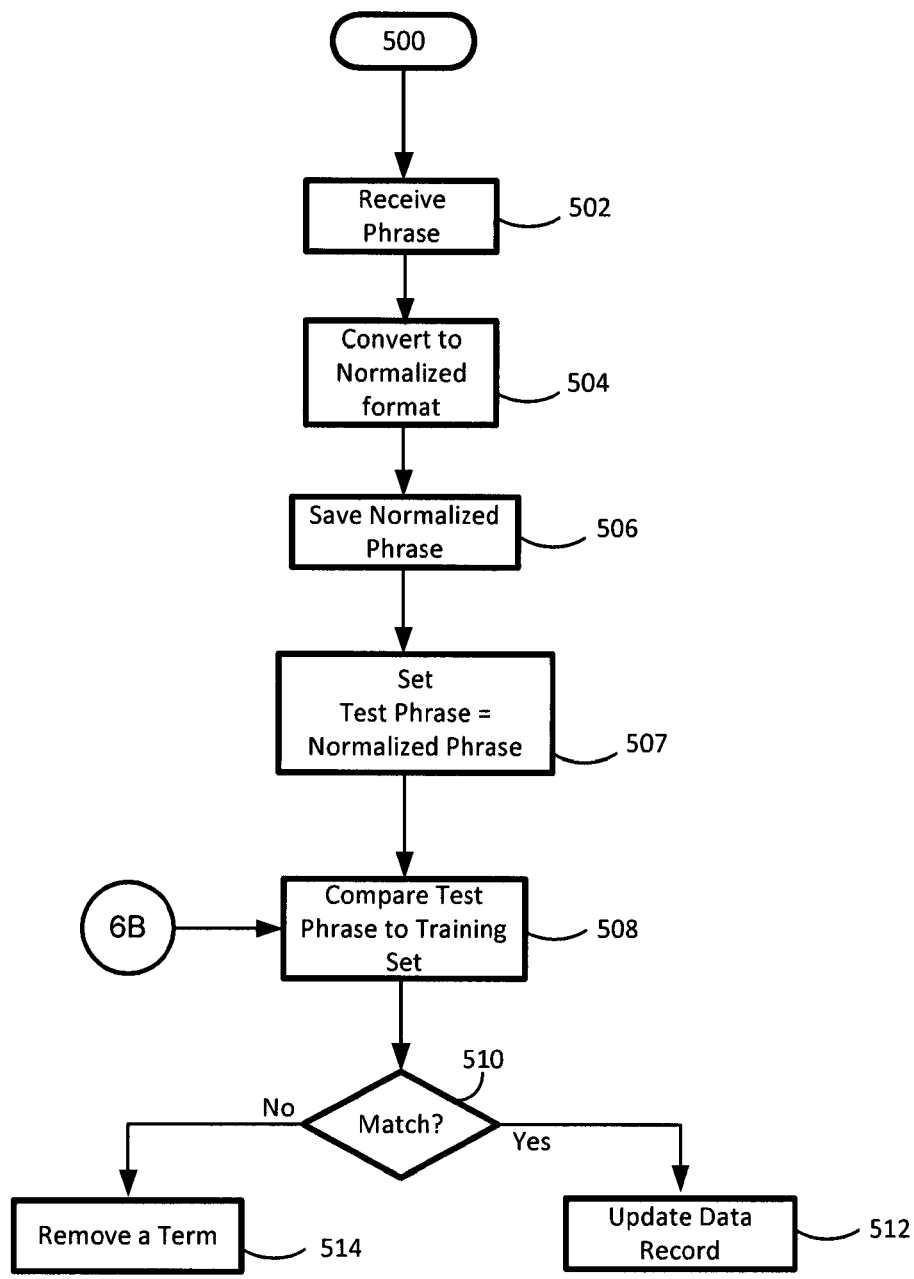
FIG. 6A is a flow chart illustrating one embodiment of a process for determining relevant information from a data stream.

Referring now to FIG. 6A, a process 500 is illustrated as a more generic version of process 400. In step 502, a phrase having multiple terms is received into a temporary buffer. In step 504, the received phrase is converted into a normalized format, e.g., all terms of the phrase are made lower case and concatenated with a symbol such as an underscore. In step 506, the normalized phrase is saved for later use. In step 507, the variable test phrase is set equal to the normalized phrase. In step 508, the test phrase is compared to a training set. If the comparison results in a match in step 510, then a data record for the received data is created or updated with relevant information associated with the matched entry in the training set in step 512. If there is not match in step 510, then a term is removed from the test phrase in step 514, and the comparison step is repeated in step 508. This process iterates until a match is found or no more terms remain to be compared.

Figure 6B:
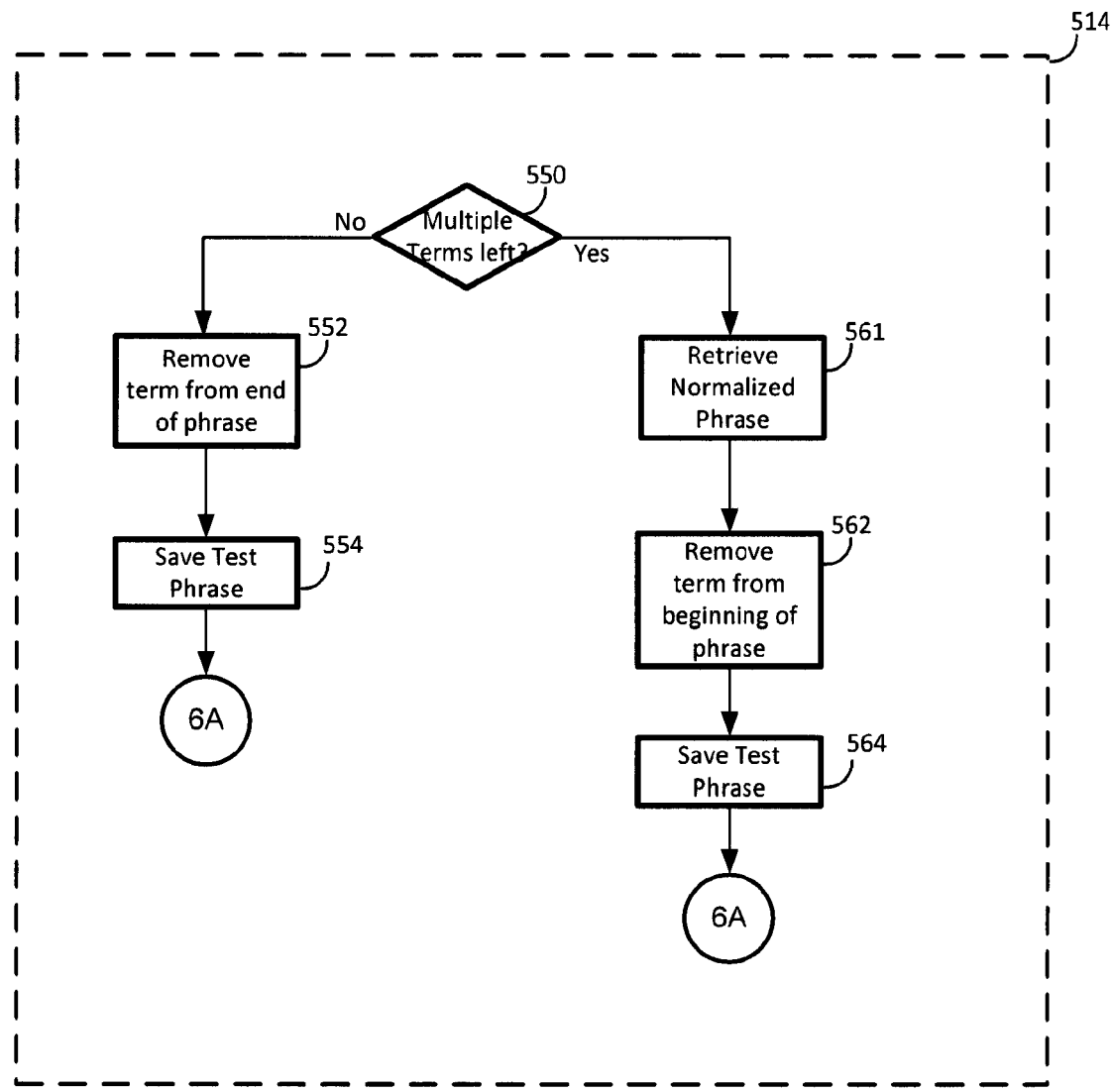
FIG. 6B is a flow chart illustrating additional process steps for a portion of the process shown in FIG. 6A.

FIG. 6B illustrates the method of step 514 for removing a term from the test phrase. If multiple terms remain in step 550, then the term at the end of the test phrase is removed in step 552 to form a modified test phrase. The modified phrase is saved as the test phrase in step 554, and the process returns to the comparison of step 508.

If multiple terms do not remain in the test phrase in step 550, then the normalized phrase is retrieved from storage in step 561, and the term as the beginning of the test phrase is removed in step 562 to form a modified test phrase. The modified phrase is saved as the test phrase in step 564, and the process returns to the comparison of step 508.

3. Training Sets

In one or more embodiments, training sets may be generated to provide a baseline score for various titles, ranks and/or departments. The training sets are manually generated, at least initially, using known titles, ranks and departments. The training sets may be updated, either manually or automatically, to include results from actual comparisons. FIG. 7 shows an exemplary training set for ranks, where the lookup table includes known titles in the first column, an assigned rank in the second column, and an assigned weight for each rank in the third column. Likewise, FIG. 8 shows an exemplary training set for departments, where the lookup table includes known titles in the first column, an assigned department in the second column, and an assigned weight for each department in the third column. A numerical classification of rank and department can be arbitrary so long as it is consistent and systematic.

As an example of the ambiguity that may exist when considering departments and rank, the title of Vice President of Sales and Marketing may actually belong to two different departments: Sales and/or Marketing. Thus, inferring the department from this title really involves an educated guess, which may be machine-evaluated based on the content in the title field, for example, by using the lookup table to match terms to known department names, or through using probabilistic techniques to score and accept or reject possible department names.

Ranks and department names may also become known over time through machine learning methods using training sets, for example, and one or more lookup tables can be stocked and updated with results of such methods.

In one embodiment, the rank is a number that is assigned to a title in correspondence with the management level of the contact in the company. For example, a typical corporate hierarchy assigns the Executive level with rank $r=10$; the Vice-President level has rank $r=20$; the Director level has rank $r=30$; the Manager level has rank $r=40$; and the Staff level has rank $r=50$. While this example is typical, it is merely one embodiment and other variations may of course exist in large and small organizations. Likewise, in one embodiment, the corporate departments are assigned an arbitrary numerical indicator. For example, Sales=10; Marketing=20; Finance & Administration=30; Human Resources=40; Support=50; Engineering & Research=60; Operations=70; and Information Technology & Information Services=80.

4. Detailed System Description

FIG. 9 is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 9 (and in more detail in FIG. 10), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 9, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 9 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
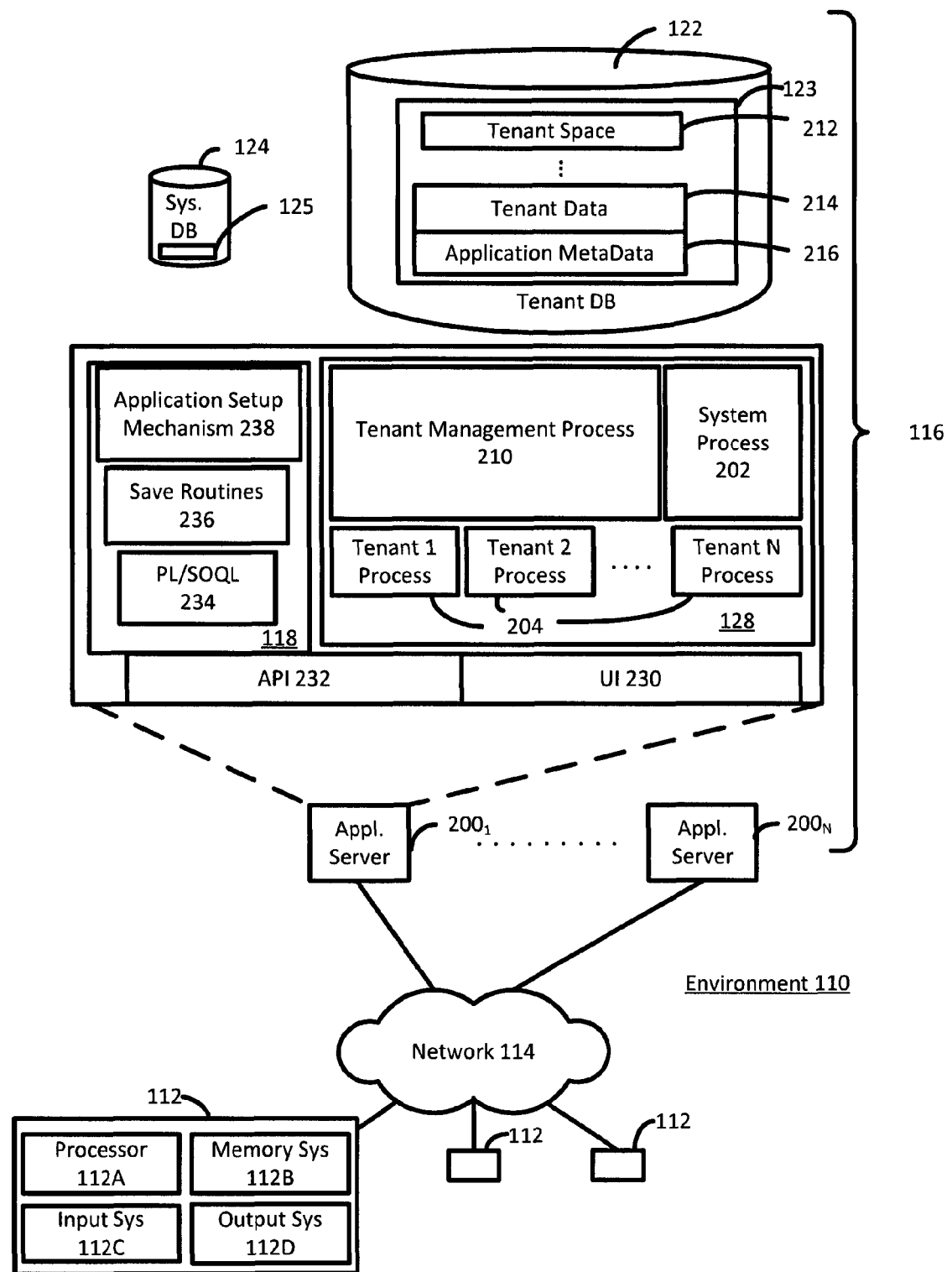
FIG. 10 illustrates a block diagram of an embodiment of elements of FIG. 8 and various possible interconnections between those elements.

FIG. 10 also illustrates environment 110. However, in FIG. 10 elements of system 116 and various interconnections in an embodiment are further illustrated. FIG. 10 shows that user system 112 may include processor system 1110, memory system 1111, input system 112C, and output system 112D. FIG. 10 shows network 114 and system 116. FIG. 10 also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 9. Regarding user system 112, processor system 1110 may be any combination of one or more processors. Memory system 1111 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 10, system 116 may include a network interface 115 (of FIG. 9) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

5. Conclusion

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for operating a database to determine an organizational hierarchy from contact data, the database being configured to store the contact data as a plurality of contact records, each contact record having a defined set of entities, including at least a name and a title, comprising:
   receiving contact data at the database including a phrase representing a title, the phrase having a plurality of terms;
   converting each term of the phrase to lower case;
   concatenating the plurality of converted terms using a symbol to separate the terms thereby forming a normalized phrase, then setting a test phrase equal to the normalized phrase;
   generating one or more sets of defined phrases; and
   comparing the test phrase to the sets of defined phrases, the sets of defined phrases representing known titles and stored in one or more lookup table as normalized phrases, each of the lookup table including organizational hierarchy information corresponding to each known title and a rank and a weight associated with the organizational hierarchy information;
   wherein, if the test phrase matches a first phrase in the set of defined phrases, a contact record for the received contact data is updated to include the organizational hierarchy information and the rank and weight corresponding with the matching first phrase in the lookup table; and wherein, if the test phrase does not match any phrase in the set of defined phrases, the test phrase is shortened by removing a term, and the comparison step is repeated with the shortened test phrase.

2. The method of claim 1, the comparison step further comprising the test phrase being shortened by removing the term from the end of the test phrase.

3. The method of claim 2, further comprising, if there are no more terms to remove in the test phrase:

retrieving the normalized phrase, then setting the test phrase equal to the normalized phrase;

shortening the test phrase by removing a term at the start of the test phrase; and repeating the comparison step with the shortened test phrase.

4. The method of claim 1, wherein the organizational hierarchy information is rank.

5. The method of claim 1, wherein the organizational hierarchy information is department.

6. The method of claim 1, wherein the weights are a measure of a likelihood that the organizational hierarchy information corresponds to the title.

7. The method of claim 1, further comprising generating a second lookup table to include titles with corresponding departments and weights.

8. The method of claim 1, the step of updating the contact record further comprising creating or updating the contact record.

9. A non-transitory computer-readable storage medium encoded with executable instructions for determining organizational hierarchy from contact data, wherein a database is configured to store the contact data as a plurality of contact records, each contact record having a defined set of entities, including at least a name and a title, the instructions comprising:

receiving contact data at the database including a phrase representing a title, the phrase having a plurality of terms;

converting each term of the phrase to lower case; concatenating the plurality of converted terms using a symbol to separate the terms thereby forming a normalized phrase, then setting a test phrase equal to the normalized phrase;

generating one or more sets of defined phrases; and comparing the test phrase to the sets of defined phrases, the sets of defined phrases representing known titles and stored in one or more lookup table as normalized phrases, each of the lookup table including organizational hierarchy information corresponding to each known title and a rank and a weight associated with the organizational hierarchy information;

wherein, if the test phrase matches a first phrase in the set of defined phrases, a contact record for the received contact data is updated to include the organizational hierarchy information and the rank and weight corresponding with the matching first phrase in the lookup table; and wherein, if the test phrase does not match any phrase in the set of defined phrases, the test phrase is shortened by removing a term, and the comparison step is repeated with the shortened test phrase.

10. The computer-readable storage medium of claim 9, the instructions further comprising shortening the test phrase by removing the term from the end of the test phrase.

11. The computer-readable storage medium of claim 10, the instructions further comprising, when there are no more terms to remove in the test phrase:

retrieving the normalized phrase, then setting the test phrase equal to the normalized phrase;

shortening the test phrase by removing a term at the start of the test phrase; and repeating the comparison step with the shortened test phrase.

12. The computer-readable storage medium of claim 9, further comprising generating a second lookup table to include titles with corresponding departments and weights.

13. A system for determining organizational hierarchy from contact data, wherein the system is configured to store the contact data as a plurality of contact records, each contact record having a defined set of entities, including at least a name and a title, comprising:

a processor; and a non-transitory computer readable medium storing a plurality of instructions which, when executed by the processor, cause the processor to carry out the steps of:

receiving contact data including a phrase representing a title, the phrase having a plurality of terms;

converting each term of the phrase to lower case;

concatenating the plurality of converted terms using a symbol to separate the terms thereby forming a normalized phrase, then setting a test phrase equal to the normalized phrase;

generating one or more sets of defined phrases; and comparing the test phrase to the sets of defined phrases, the sets of defined phrases representing known titles and stored in one or more lookup table as normalized phrases, each of the lookup table including organizational hierarchy information corresponding to each known title and a rank and a weight associated with the organizational hierarchy information;

wherein, if the test phrase matches a first phrase in the set of defined phrases, a contact record for the received contact data is updated to include the organizational hierarchy information and the rank and weight corresponding with the matching first phrase in the lookup table; and wherein, if the test phrase does not match any phrase in the set of defined phrases, the test phrase is shortened by removing a term, and the comparison step is repeated with the shortened test phrase.

14. The system of claim 13, the instructions further comprising shortening the test phrase by removing the term from the end of the test phrase.

15. The system of claim 14, the instructions further comprising, when there are no more terms to remove in the test phrase:

retrieving the normalized phrase, then setting the test phrase equal to the normalized phrase;

shortening the test phrase by removing a term at the start of the test phrase; and repeating the comparison step with the shortened test phrase.

16. A method for operating a database to determine relevant information from an incoming data stream, the database being configured to store data records each having a defined set of entities, including at least a first entity, comprising:

receiving a phrase having a plurality of terms;

converting each term of the received phrase to a normalized format thereby forming a normalized phrase;

setting a test phrase equal to the normalized phrase;

generating one or more sets of defined phrases; and comparing the test phrase to the sets of defined phrases, the sets of defined phrases representing known titles and stored in one or more lookup table as normalized phrases, each of the lookup table including organizational hierarchy information corresponding to each known title and a rank and a weight associated with the organizational hierarchy information;

wherein, if the test phrase matches a first phrase in the set of defined phrases, a data record for the received data stream is updated to include the relevant information and the rank and weight corresponding with the matching first phrase in the lookup table; and wherein, if the test phrase does not match any phrase in the set of defined phrases, the test phrase is shortened by removing a term, and the comparison step is repeated with the shortened test phrase.

* * * * *